United States Patent [19]

Agawa

[11] 4,174,626
[45] Nov. 20, 1979

[54] FUEL GAUGE

[75] Inventor: Yasushi Agawa, Yokohama, Japan

[73] Assignee: Tokyo Shibaura Electric Co., Ltd., Japan

[21] Appl. No.: 909,485

[22] Filed: May 25, 1978

Related U.S. Application Data

[63] Continuation of Ser. No. 767,117, Feb. 9, 1977, abandoned.

[30] Foreign Application Priority Data

Feb. 10, 1976 [JP] Japan .................................. 51-13554

[51] Int. Cl.² .............................................. G01F 9/00
[52] U.S. Cl. ....................................................... 73/113
[58] Field of Search .............. 73/113, 114; 235/92 FP

[56] References Cited

U.S. PATENT DOCUMENTS

| | | | |
|---|---|---|---|
| 3,589,176 | 6/1971 | Wellons | 73/113 |
| 3,812,710 | 5/1974 | Bauman et al. | 73/114 |
| 3,908,451 | 9/1975 | Walker et al. | 73/114 |
| 3,998,094 | 12/1976 | Martin | 73/113 |
| 4,005,409 | 1/1977 | Feuer | 235/92 FP |
| 4,012,948 | 3/1977 | Kuno et al. | 73/113 |

Primary Examiner—Anthony V. Ciarlante
Attorney, Agent, or Firm—Finnegan, Henderson, Farabow & Garrett

[57] ABSTRACT

An automobile fuel gauge is used for an automobile wherein the operation of an electromagnetic fuel injection valve is controlled by a control signal supplied from an electronic fuel injection control system, thereby regulating an amount of fuel supplied to an engine cylinder. The fuel gauge includes a counter circuit for counting pulse signals included in the control signal and related to the opening of the electromagnetic fuel injection valve. The total length of time for which the electromagnetic fuel injection valve is opened is measured from the number of said central pulse signals issued, thereby determining the amount of fuel supplied to the engine cylinders through the electromagnetic fuel injection valve thus measuring the amount of consumed fuel.

2 Claims, 3 Drawing Figures ical fuel gauge

FUEL GAUGE

This is a continuation of application Ser. No. 767,117, filed 2/9/77 now abandoned.

BACKGROUND OF THE INVENTION

This invention relates to a fuel gauge and more particularly to a fuel guage provided with an electronic fuel injection control system and adapted to be carried on an automobile.

The prior art fuel gauge for measuring the amount of gasolene remaining in a fuel tank of an automobile comprises a float rising or falling according to an amount of gasolene left in the fuel tank and a slide resistor interlockingly operated with the vertical movement of the float. This conventional fuel gauge measures the current passing through the slidable resistor whose resistance varies with the vertical movement of the float and is designed to indicate the measured amount of current by a pointer. However, the prior art automobile fuel gauge which detects the level of gasolene in the fuel tank by the position of the float fails to inform a driver of the exact amount of consumed gasolene, because the gasolene level fluctuates due to the fuel tank being shaken and tilted during operation of the automobile.

Therefore, the customary automobile fuel gauge only roughly indicates three stages of fuel amount as F (full), 1/2 and E (empty). While such rough indication may well serve the purpose for the run of an automobile, development of a fuel gauge which could accurately measure fuel consumption would offer great convenience.

It may be contemplated to use a flow meter as a means for correctly measuring fuel consumption. Since, however, the flow meter is expensive, a fuel gauge provided with such flow meter can not be widely accepted in view of cost except for expensive types of cars such as luxury and racing cars.

SUMMARY OF THE INVENTION

It is accordingly an object of the invention to provide an inexpensive automobile fuel gauge capable of accurately measuring fuel consumption.

According to one aspect of this invention, there is provided an automobile fuel gauge for an automobile provided with an electronic fuel injection control system, which controls the operation of an electromagnetic fuel injection valve by a control signal supplied from the fuel injection control system, thereby regulating the amount of gasolene charged into the engine cylinders. The automobile fuel gauge of this invention causes a control signal to be generated by the fuel injection control system and applied to the electromagnetic fuel injection valve and is further provided with a counter circuit which measures the length of time for which gasolene is charged into the engine cylinder by counting pulses included in said control signal while the electromagnetic valve is opened, and produces an output indicating the total of counted fuel injection periods representing total fuel consumption. The output signal from the counter circuit which denotes total fuel consumption is visibly indicated by display means.

DESCRIPTION OF THE PREFERRED EMBODIMENTS

Figure 1:
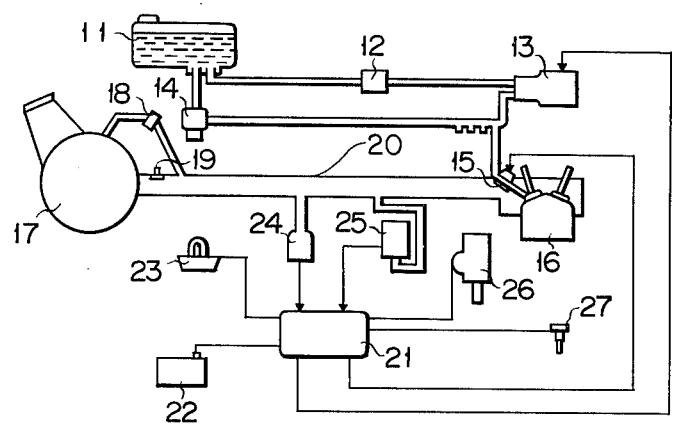
FIG. 1 is a schematic arrangement of an automobile power device provided with an electronic fuel injection control system according to this invention.

With the power system for an electronic fuel injection type automobile, a fuel tank 11 is connected to a fuel pump 13 through a fuel filter 12, causing gasolene to be supplied from the fuel tank 11 to the fuel pump 13 through the fuel filter 12. A fuel pressure control means 14 is provided to maintain the pressure of gasolene injected from the fuel pump 13 into an engine cylinder 16 through an electromagnetic fuel injection valve 15. An air filter 17 delivers air to the engine cylinder 16 through an intake manifold 20 comprising an air addition valve 18 and throttle valve 19, together with gasolene supplied from the fuel pump 13. The electronic fuel valve 15 and fuel pump 13 are designed to have the operation controlled by a control signal issued from an electronic fuel injection control system 21. This fuel injection control system 21 receives output signals from a throttle actuator 23 driven by power supplied from a battery 22 and coupled to an acceleration pedal, pressure gauge 24 for detecting pressure in the intake manifold 20, pressure switch 25 connected to the intake manifold 20, distributor 26 and thermometer 27, and handles information carried by the above-mentioned various signals, thereby sending forth a control signal for controlling the operation of the fuel pump 13 and electromagnetic fuel injection valve 15 in order to supply the engine cylinder 16 with an optimum amount of fuel and air for operation of the automobile.

Figure 2:
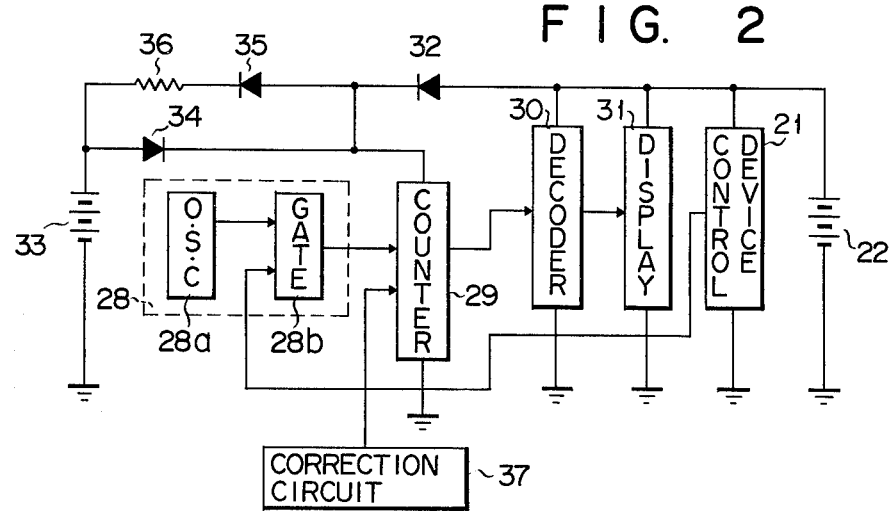
FIG. 2 is a block circuit diagram of a fuel gauge according to one embodiment of the invention.

The object of this invention is to provide a fuel gauge adapted to be carried on an automobile fitted with the electronic fuel injection control system 21. A control signal from this electronic fuel injection control system 21 is used to control the length of time for which the electromagnetic fuel injection valve 15 is requird to be opened in order to supply the engine cylinder 16 with an optimum amount of fuel for operation of the automobile through said electromagnetic fuel injection valve 15. If, in this case, fuel is supplied at a fixed level of pressure, then the length of time for which the electromagnetic fuel injection valve 15 is opened can be taken to be proportional to an amount of consumed fuel. Therefore, if measurement is made of the length of time for which the fuel injection electromagnetic valve 15 is opened by counting pulse signals included in a control signal issued for control of the opening of the electromagnetic valve 15 from the fuel injection control system 21 to said electromagnetic valve 15, then it will be possible accurately to determine a total amount of fuel consumed by the automobile engine by adding up the lengths of time for which the electromagnetic valve 15 was repeatedly opened. This invention has been accomplished on the bases of the above-mentioned principle. There will now be described by reference to FIG. 2 a fuel gauge according to an embodiment of this invention.

The electronic fuel injection control system 21 is operated by power supplied from the battery 22. A control signal issued for the opening of the electromagnetic fuel injection valve 15 from the control system 21 to the electromagnetic valve 15 includes pulse signals each having a width corresponding to the length of time for which said electromagnetic valve 15 is opened. The control signal is delivered to a pulse width-measuring circuit 28 to determine the pulse width corresponding to the length of time for which the electromagnetic valve 15 is opened. The pulse width-measuring circuit 28 comprises an oscillation circuit 28a for generating clock pulses having a prescribed freqeuncy and a gate circuit 28b supplied with output clock pulses from the oscillation circuit 28a and a control signal issued from the fuel injection control system 21. The output terminal of the pulse width-measuring circuit 28 or the gate circuit 28b is connected to a programmable counter circuit 29. An output terminal of this programmable counter circuit 29 is connected through a decoder circuit 30 to a display device 31, for example, a digital light-emitting display device. The battery 22 supplies power to the decoder circuit 30 and display device 31 and also to the programmable counter circuit 29 forwardly through a diode 32. The programmable counter circuit 29 is operated by power supplied from a backup battery 33 forwardly through a diode 34. The backup battery 33 is connected to the battery 22 to be charged thereby normally through diodes 32, 35 and resistor 36.

Where, with the above-mentioned circuit arrangement, the gate circuit 28b is supplied with pulse signals having, for example, a "1" level included in a control signal issued from the electronic fuel injection control system 21 which are used to open the electromagnetic valve 15, then said gate circuit 28b is opened to allow output clock pulses from the oscillation circuit 28a to be supplied to the programmable counter circuit 29. This programmable counter 29 counts clock pulses issued from the oscillation circuit 28a to said counter 29 during a length of time corresponding to the width of each "1" level pulse sent forth from the electronic fuel injection control system 21, namely, while the electromagnetic valve 15 is opened, and stores an a count corresponding to a total number of counted clock pulses. The output from the programmable counter 29 denoting a total number of counted clock pulses is decoded by the decoder 30 and conducted to the digital light-emitting display device 31 visibly to indicate fuel consumption. With the programmable counter 29, when the ignition switch (not shown) is rendered inoperative and power ceases to be supplied from the battery then the information indicating the total amount of fuel consumption stored in the programmable counter 29 is cleared. However, in the present system the programmable counter 29 is rendered nonvolatile by being supplied with power from the backup battery 33 when the battery 22 ceases to deliver power to the programmable counter 29. Further, the programmable counter 29 is so designed as to have a number of counted clock pulses corrected by an output from a correction circuit 37 in order to establish a truthful relationship between the length of time for which the electromagnetic fuel injection valve 15 remains open and an amount of fuel actually consumed. The correction circuit 37 produces a signal for correcting variations in the measured value resulting from different kinds of fuel used and changes with time in the function of the electronic fuel injection control system 21, thereby enabling the programmable counter 29 always to indicate a correct measured value.

The foregoing description refers to the case where the fuel gauge was used to measure the amount of consumed fuel. However, the fuel gauge may be arranged so as to determine the amount of fuel remaining in the fuel tank 11. In this case, an arithmetic operation circuit 38 is provided between the programmable counter 29 and decoder 30. The arithmetic operation circuit 38 arithmetically processes that data denoting the amount of fuel initially charged into the fuel tank 11 manually or mechanically which has been received through an input circuit 39 and the data showing the amount of fuel actually consumed which has been sent forth from the programmable counter 29. The result of arithmetic subtraction operation is supplied to the display circuit 31 through the decoder 30 to be visibly indicated. A fuel gauge arranged as described above accurately measures the remainder of fuel in the fuel tank 11.

Figure 3:
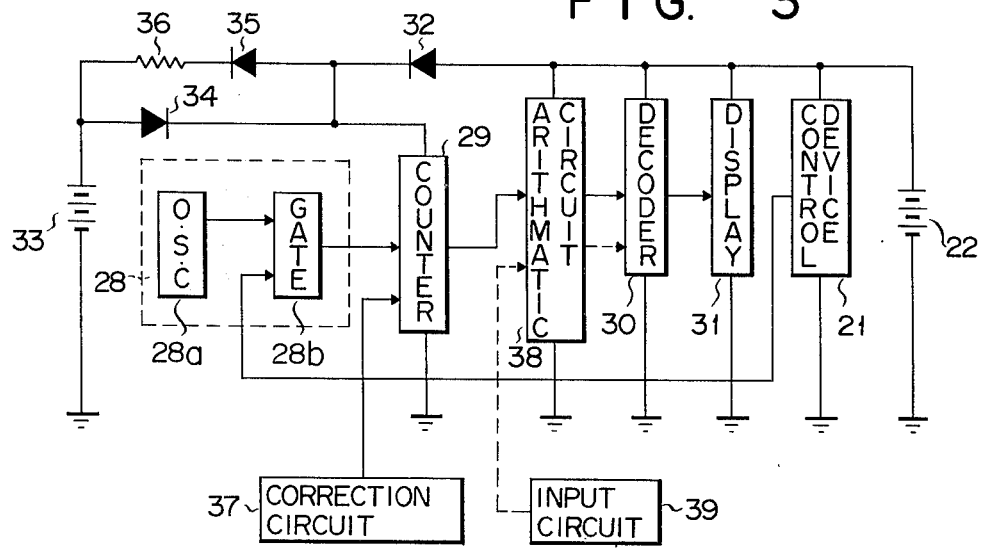
FIG. 3 is a block circuit diagram of a fuel gauge according to another embodiment of the invention.

The above-described fuel remainder gauge may be further technically improved into the type which indicates the mileage of an automobile which can be further covered by the remaining fuel. In this case, the arithmetic operation circuit 38 is supplied from the input circuit 39 of FIG. 3 with data showing an amount of fuel initially charged into the fuel tank 11 and data denoting an automobile mileage covered by a unit amount of fuel.

The arithmetic operation circuit 38 figures out the remaining amount of fuel and the mileage to be covered by said remaining fuel. Data on the remaining amount of fuel and the automobile mileage to be covered thereby which have been calculated by the arithmetic operation circuit 38 are indicated by the display device 38 through the decoder 30. In this case, the display device 31 may be so arranged as to indicate both remaining fuel and automobile mileage to be covered thereby on separate display sections, or selectively indicate either of both Figures on a single display section, for example, by proper operation of a changeover switch.

As described above, this invention provides an inexpensive fuel gauge which measures a total length of time for which the electromagnetic fuel injection valve is opened by the control signal from the electronic fuel injection control system, thereby accurately determining fuel consumption. Further, the fuel gauge of the invention can have its control section readily manufacture through use of integrated circuit techniques admitting of low cost quantity production.

The above-mentioned embodiments are of a digital display type, but may be rearranged into an analog display type. Further, said display should preferably be made only where necessary to decrease power consumption.

What is claimed is:

1. A gauge for measuring fuel consumption in an engine employing an electronic fuel injection control system having means for generating a control signal for controlling the opening and closing of a fuel injection valve, said control signal including a series of control pulses for controlling the opening of said valve wherein the width of each pulse corresponds to the time said valve is open during each injection cycle, said gauge comprising: a clock pulse generator for generating clock pulses; a logic gate circuit for passing, in response to each said control pulse, a number of clock pulses corresponding to the width of said control pulse; an electronic counter connected to said logic gate for counting the clock pulses passed by said logic gate circuit; a principal power supply for energizing said counter through a power supply input thereto; a backup power supply; a first diode connected in a forward direction from said principal power supply to said power supply input of said counter whereby said counter is supplied with power for operation; a second diode connected in a forward direction from said backup power supply to said power supply input of said counter, said diodes operating such that when the voltage output from said principal power supply drops below a predetermined level established by said backup power supply, said power supply input is isolated from said principal power supply and is supplied with power from said backup power supply to be maintained at said predetermined level; and a display device for displaying the contents of said counter.

2. The fuel gauge according to claim 1 further comprising circuit means including a third diode connected in a forward direction from said principal power supply to said backup power supply, whereby said backup power supply is charged by said principal power supply during normal operation and is isolated therefrom in the event of a substantial drop in the principal power supply voltage.

* * * * *